United States Patent
Foley et al.

(10) Patent No.: US 9,017,772 B2
(45) Date of Patent: Apr. 28, 2015

(54) PROCESS FOR FABRICATION OF SEAMLESS UV CURED INTERMEDIATE TRANSFER BELTS (ITB)

(75) Inventors: Geoffrey M. T. Foley, Fairport, NY (US); Jin Wu, Pittsford, NY (US); Satchidanand Mishra, Webster, NY (US); Kent J. Evans, Lima, NY (US)

(73) Assignee: Xerox Corporation, Norwalk, CT (US)

( * ) Notice: Subject to any disclaimer, the term of this patent is extended or adjusted under 35 U.S.C. 154(b) by 707 days.

(21) Appl. No.: 12/832,322

(22) Filed: Jul. 8, 2010

(65) Prior Publication Data
US 2012/0009352 A1    Jan. 12, 2012

(51) Int. Cl.
| | |
|---|---|
| C08J 7/04 | (2006.01) |
| C09D 133/14 | (2006.01) |
| C09D 133/06 | (2006.01) |
| C09D 133/08 | (2006.01) |
| G03G 15/16 | (2006.01) |
| C09D 4/00 | (2006.01) |

(52) U.S. Cl.
CPC ............ *C09D 133/14* (2013.01); *C09D 133/06* (2013.01); *C09D 133/08* (2013.01); *G03G 15/162* (2013.01); *C09D 4/00* (2013.01)

(58) Field of Classification Search
USPC .................................................. 427/508, 512
See application file for complete search history.

(56) References Cited

U.S. PATENT DOCUMENTS

| | | | | |
|---|---|---|---|---|
| 4,410,081 | A  * | 10/1983 | Weihe, Jr. ...................... | 198/725 |
| 6,455,103 | B1 * | 9/2002 | Mennig et al. ................ | 427/165 |
| 6,751,435 | B2 * | 6/2004 | Hsieh et al. ................... | 399/302 |
| 7,416,824 | B2 * | 8/2008 | Kondoh et al. ............ | 430/58.85 |
| 2007/0188585 | A1* | 8/2007 | Mochizuki et al. ........... | 347/140 |
| 2011/0123732 | A1 | 5/2011 | Foley et al. | |
| 2011/0233475 | A1 | 9/2011 | Foley et al. | |

FOREIGN PATENT DOCUMENTS

| | | | |
|---|---|---|---|
| GB | 2193073 A | * | 2/1988 |
| JP | 2006160771 A | * | 6/2006 |
| WO | WO 2009035457 A1 | * | 3/2009 |

OTHER PUBLICATIONS

Abs. of JP2006160771A, Jun. 2006, Japan, Anzai et al.*

* cited by examiner

*Primary Examiner* — Elena T Lightfoot
(74) *Attorney, Agent, or Firm* — MH2 Technology Law Group LLP

(57) ABSTRACT

Various embodiments provide methods and apparatus for forming intermediate transfer belts (ITBs) by combining a dip-coating process with a UV-curing process. In an embodiment, an ITB substrate can be immersed into a liquid coating composition contained in a dip tank and then withdrawn from the liquid coating composition. When exiting the dip tank, the coated substrate can enter a UV-curing chamber for a UV-curing process. Multiple cycles of dip-coating and UV-curing can be performed such that a desired ITB substrate coating layer thickness can be obtained. After coating the ITB substrate, the UV-cured coating composition can be released from the ITB substrate, wherein the UV-cured coating composition released from the ITB substrate forms the intermediate transfer belt.

13 Claims, 2 Drawing Sheets

PROCESS FOR FABRICATION OF SEAMLESS UV CURED INTERMEDIATE TRANSFER BELTS (ITB)

DETAILED DESCRIPTION

1. Field of the Use

The present teachings relate generally to intermediate transfer belts (ITB) used for electrostatographic devices and, more particularly, to methods and apparatus for forming ultraviolet (UV) cured ITBs.

2. Background

Conventional materials for ITBs include polyimide resins. The polyimide resins include thermoplastic polyimide resins and thermosetting polyimide resins. Conventional ITBs are fabricated either by flow coating, dip coating, extrusion molding or centrifugal molding followed by a heating process for a long period of time. For example, conventional polyimide-based ITBs are usually formed by heating at temperatures greater than 300° C. for more than 1 hour. During this heating process, coating solvents are evaporated and are often released into the environment. While conventional polyimide-based ITBs can be made seamed or even seamless, faster and cleaner fabrication processes are desired.

It is also desirable to control the thickness of ITBs. Conventional methods to form belts of desired thickness include a multiple coating process that forms a first coating layer. Subsequently, additional coating layers are formed on the first coating layer until the desired thickness is reached. Problems arise with this conventional method because solvents used to form the subsequent coating layers can dissolve previously formed coating layers.

Thus, there is a need to overcome this and other problems of the prior art and to provide methods and apparatus for forming ITBs.

SUMMARY

According to various embodiments, the present teachings include a method for forming an intermediate transfer belt (ITB). The ITB can be formed by first providing a liquid coating composition that includes a UV curable polymer. An ITB substrate can then be dip-coated in the liquid coating composition to form a coating composition covered ITB substrate. After removed from the liquid coating composition, the coating composition covered ITB substrate can be UV-cured to form a coating layer on the ITB substrate.

According to various embodiments, the present teachings also include an intermediate transfer belt (ITB). The ITB can include one or more coating layers stacked together with each coating layer including a UV cured polymer. The ITB can have a surface resistivity ranging from about $10^8$ ohms/sq to about $10^{13}$ ohms/sq, and a thickness ranging from about 30 microns to about 500 microns with a thickness uniformity within a range of ±about 3 microns.

According to various embodiments, the present teachings further include an apparatus for forming an intermediate transfer belt (ITB). The apparatus can include a dip tank configured to contain a liquid coating composition and a UV-curing chamber configured on the dip tank to provide a path for an ITB substrate to be immersed into the liquid coating composition for a dip-coating and to enter the UV-curing chamber for a UV-curing upon exiting the dip tank after the dip-coating. The liquid coating composition contained in the dip tank can include a UV curable polymer and a plurality of conductive materials.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide methods and apparatus for forming intermediate transfer belts (ITBs). In one embodiment, ITBs can be formed by a UV-curing process in conjunction with a dip-coating process, ITBs formed by this exemplary process can be seamless, and can be heterogeneous and/or homogeneous. Due to the combination of UV-curing with dip-coating, the thickness of the ITBs formed using the disclosed method can be controlled. This differs from conventional methods of forming ITBs in which there is little control over the thickness.

Figure 1:
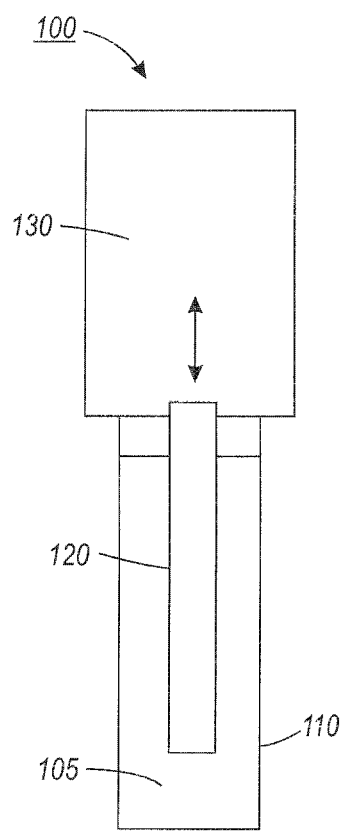
FIG. 1 is a schematic showing an exemplary apparatus for forming an ITB in accordance with various embodiments of the present teachings.

FIG. 1 is a schematic showing an exemplary apparatus 100 for forming an ITB in accordance with various embodiments of the present teachings. It should be readily apparent to one of ordinary skill in the art that the apparatus 100 represents a generalized schematic illustration and that other components can be added or existing components can be removed or modified.

As shown in FIG. 1, the apparatus 100 can include a dip tank 110, and a UV-curing chamber 130 attached to the dip tank 110, for example, configured on the dip tank 110. In embodiments, the dip tank 110 and the UV-curing chamber 130 can be configured to provide a path for a substrate 120 (also referred to herein as "an ITB substrate") to move between the UV-curing chamber and the dip tank, for example, to undergo a UV illumination and a dip-coating, respectively.

For example, to perform a dip coating, the substrate 120 can be immersed into a liquid coating composition 105 contained in the dip tank 110 for a period of time to form a coating composition covered substrate, which can then be removed or withdrawn from the liquid coating composition 105. When exiting the dip tank 110, the coating composition covered (or coated) substrate can enter the UV-curing chamber 130 for a UV-curing process. In embodiments, the apparatus 100 can be configured to allow multiple cycles of dip-coating and UV-curing such that a desired thickness can be obtained for the formed ITB coating layer.

The thickness of the final ITB coating layer can range, for example, from about 10 micron to about 500 microns, or from about 30 microns to about 400 microns, or from about 50 microns to about 200 microns, for example, from about 70 to about 120 microns, although other thicknesses are contemplated.

Referring back to FIG. 1, the liquid coating composition 105 can include one or more UV curable polymers including, but not limited to, monomeric acrylates, oligomeric acrylates and/or combinations thereof.

In embodiments, monomeric acrylates can function as co-reactants and/or diluents in the composition to adjust system viscosity. The monomeric acrylates can include, for example, trimethylolpropane triacrylates, hexanediol diacrylates, tripropyleneglycol diacrylates, dipropyleneglycol diacrylates, etc.

In embodiments, oligomeric acrylates can be viscous liquid polymers with the molecular weight ranging from several hundreds to several thousands or higher. The oligomeric acrylates can include, for example, urethane acrylates, polyester acrylates, epoxy acrylates, polyether acrylates, and olefin acrylates such as polybutadiene acrylates, etc.

The liquid coating composition 105 can also include photoinitiators, such as, for example, a photoinitiator for a surface curing of the UV curable polymer, a photoinitiator for a bulk curing through the UV curable polymer, and combinations thereof. In an exemplary embodiment, combined photoinitiators can be used to initiate the curing process. Examples of the photoinitiators can include, but are not limited to, acyl phosphines, a-hydroxyketones, benzyl ketals, a-aminoketones, and mixtures thereof.

In embodiments, the photoinitiators can be in a form of, for example, crystalline powders and/or a liquid. The photoinitiators can be present in an amount sufficient to initiate the curing process of the UV curable polymer(s). For example, the photoinitiators can be present in an amount ranging from about 0.5% to about 10%, or from about 1% to about 7%, or from about 2% to about 5% by weight of the UV curable polymer(s).

In embodiments, the liquid coating composition 105 can be heterogeneous and can include UV curable polymer(s) and conductive fillers dispersed in the composition. The coating layer formed on the substrate 120 from the heterogeneous coating composition can be a heterogeneous layer, e.g., a heterogeneous ITB, including conductive fillers dispersed in UV cured polymer resins. The conductive fillers can be conductive and/or semi-conductive.

The conductive fillers can include, but are not limited to, carbon blacks such as contactive furnace carbon blacks and acetylene blacks, carbon nanotubes, fullerenes (e.g., $C_{60}$ and $C_{70}$), polyanilines, stannic oxides, indium oxides, tin oxide, titanium oxide, antimony tin oxide, indium tin oxide, zinc oxide, potassium titanates and/or other types of conductive and semi-conductive powders.

In embodiments, the heterogeneous coating composition can be prepared by ball milling the conductive fillers in a liquid UV curable polymer, and then adding corresponding photoinitiators into the milled dispersion. The final heterogeneous ITB coating layer can include conductive fillers ranging from about 0.1% to about 50%, or from about 1% to about 30%, or ranging from about 3% to about 20% by weight of the total heterogeneous ITB coating layer.

Alternatively, the liquid coating composition 105 can be homogeneous and can include UV curable polymers and conductive species that are soluble, compatible, or miscible with the UV curable polymers. The homogeneous liquid composition can be dip-coated on the substrate 120 and can form a UV cured homogeneous ITB coating layer. In embodiments, the ITB coating layer can have uniform electrical resistivities in bulk and/or on surfaces.

The conductive species used in a homogeneous coating composition can include, but are not limited to, salts of organic sulfonic acid such as sodium sec-alkane sulfonate (ARMOSTAT® 3002 from AKZO Nobel) and sodium C10-C18-alkane sulfonate (HOSTASTAT® HS1FF from Clariant), esters of phosphoric acid such as STEPFAC® 8180, 8181, 8182 (phosphate esters of alkyl polyethoxyethanol), 8170, 8171, 8172, 8173, 8175 (phosphate esters of alkylphenoxy polyethoxyethanol), POLYSTEP® P-11, P-12, P-13 (phosphate esters of tridecyl alcohol ethoxylates), P-31, P-32, P-33, P-34, P-35 (phosphate esters of alkyl phenol ethoxylates), all available from Stepan Corporation, esters of fatty acids such as HOSTASTAT® FE20liq from Clariant (Glycerol fatty acid ester), ammonium or phosphonium salts such as benzalkonium chloride, N-benzyl-2-(2,6-dimethylphenylamino)-N,N-diethyl-2-oxoethanaminium benzoate, cocamidopropyl betaine, hexadecyltrimethylammonium bromide, methyltrioctylammonium chloride, and tricaprylylmethylammonium chloride, behentrimonium chloride (docosyltrimethylammonium chloride), tetradecyl(trihexyl)phosphonium chloride, tetradecyl(trihexyl)phosphonium decanoate, trihexyl(tetradecyl)phosphonium bis 2,4,4-trimethylpentylphosphinate, tetradecyl(trihexyl)phosphonium dicyanamide, triisobutyl(methyl)phosphonium tosylate, tetradecyl(trihexyl)phosphonium bistriflamide, tetradecyl(trihexyl) phosphonium hexafluorophosphate, tetradecyl(trihexyl) phosphonium tetrafluoroborate, ethyl tri(butyl)phosphonium diethylphosphate, etc.

The homogeneous composition can be prepared by mixing the conductive species in a liquid UV curable polymer to form a solution, and then adding photoinitiators into the solution. The final homogeneous ITB coating layer can include conductive species ranging from about 1% to about 40%, or ranging from about 5% to about 30%, or ranging from about 10% to about 20% by weight of the total homogeneous ITB layer.

The ITB coating layer can be formed by, for example, first providing a coating composition 105 in the dip tank 110, as seen in FIG. 1. The coating composition can include liquid UV curable polymers, conductive materials including the conductive fillers, and/or the conductive species as described above, photoinitiator(s) and/or other additives.

The substrate 120 can be selected depending on specific ITB configurations. For example, the substrate 120 can include conventional cylindrical mandrels. The substrate 120 can also include non-cylindrical mandrels on which ITB coating layers can be formed with more efficient dipping. The formed ITBs are seamless. For example, the non-cylindrical substrate can have a cross sectional shape including, but not limited to, a rectangle, a square, a star, a triangle, or other shapes. In embodiments, the substrate 120 can be made of any supporting material including, for example, plastic, metal, glass, ceramic, semiconductor, wood, metal, and/or a mixture thereof.

The substrate 120 can have a desirable large area for simultaneously forming one or more ITBs thereon. In embodiments, a single dip tank can be used. The single dip tank can have suitable dimensions to accommodate the large area substrate.

Figure 2A:
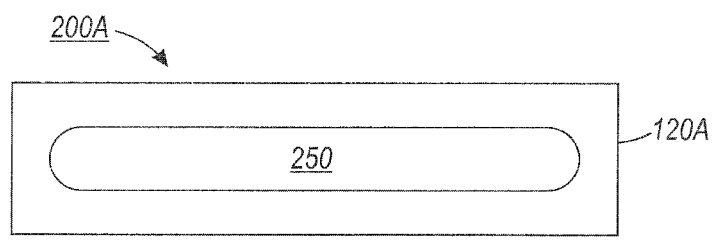
FIGS. 2A-2B depict exemplary ITB(s) formed on a substrate in accordance with various embodiments of the present teachings.
Figure 2B:
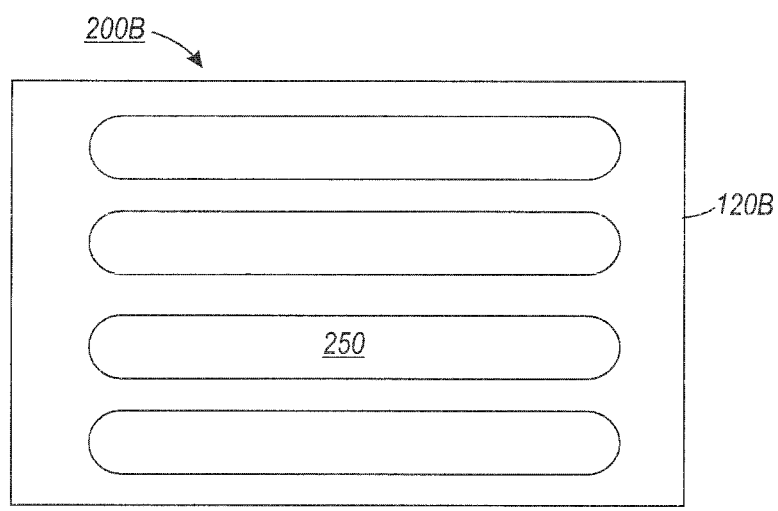

FIGS. 2A-2B depict exemplary ITB substrates 120A-B selected for forming various ITBs 250 in accordance with various embodiments of the present teachings.

The ITB substrates 120A-B can be selected to have suitable dimensions to accommodate one or more ITBs 250 to be formed thereon. In FIG. 2A, a single ITB 250 can be formed on the FIB substrate 120A. In FIG. 2B, a plurality of ITBs 250 can be simultaneously formed on the ITB substrate 120B with each ITB 250 having same or different dimensions.

Each ITB 250 can have a belt width ranging from about 8 to about 40 inches, or from about 10 to about 36 inches, or from about 10 to about 24 inches. Each ITB 250 can have a length or circumference ranging from about 8 to about 60 inches, or from about 10 to about 50 inches, or from about 15 to about 35 inches.

The plurality of ITBs 250 shown in FIG. 2B can be arranged in arrays, for example, having a center-to-center spacing between adjacent ITBs of from about 10 inches to about 200 inches, or from about 20 inches to about 150 inches, or from about 30 inches to about 100 inches.

Referring back to FIG. 1, the ITB substrate 120 can be immersed in the liquid coating composition 105 for a period of time to form a coating composition covered (or coated) substrate, which can then be withdrawn from the liquid coating composition 105. Upon exiting the dip tank 110, the composition coated substrate can enter the UV-curing chamber 130.

The thickness of each coating layer can be determined by, e.g., dip-coating time, composition viscosity, withdrawing speed, UV wavelength, UV power, and/or UV-curing time.

The liquid coating composition 105 can have a viscosity ranging from about 50 centipoises to about 1,500 centipoises, or ranging from about 150 centipoises to about 1,000 centipoises, or ranging from about 300 centipoises to about 700 centipoises. In embodiments, the dip-coating can be performed for a time length ranging from about 1 minute to about 20 minutes, or ranging from about 2 minutes to about 15 minutes, or ranging from about 3 minutes to about 10 minutes.

The coated substrate can be withdrawn from the coating composition at a constant speed ranging from about 10 to about 400 millimeters per minute, or ranging from about 50 to about 300 millimeters per minute, or ranging from about 100 to about 200 millimeters per minute. Alternatively, the coated substrate can be withdrawn from the coating composition at a speed programmed to minimize gravity effects at the beginning and the end of the withdrawal. For example, the withdrawing speed can be linearly decreased from the beginning to the end to maintain desired coating thickness uniformity.

Upon entering the UV-curing chamber 130, the coating composition covered substrate can be UV-cured. Depending on the UV curable polymers and the photoinitiators used, the UV-curing process can be conducted at a wavelength, for example, ranging from about 200 nm to about 400 nm, including from about 240 nm to about 370 nm, or from about 270 nm to about 340 nm.

The UV-curing can be performed for a period of time, for example, ranging from about 1 second to about 600 seconds, or ranging from about 5 seconds to about 300 seconds, or ranging from about 10 seconds to about 120 seconds.

After a first cycle of dip-coating and UV-curing to form a first coating layer of UV cured polymer on the substrate, additional formation cycles can be repeated on the first UV cured coating layer such that a plurality of coating layers can be stacked on the substrate to provide a desirable thickness. For example, the UV cured substrate having the first coating layer can be re-immersed into the liquid coating composition in the dip tank for a second dip-coating process. The substrate having a composition coated first coating layer can then be removed from the liquid coating composition and then enter the UV-curing chamber for a second UV-curing to form a second UV cured coating layer on the first coating layer until a desired thickness is achieved.

In contrast, conventional methods of forming ITBs may include a dip-coating followed by a lengthy air or oven-drying, with substantial gravity effects that give rise to a non-uniform thickness. Because the UV-curing can be performed at high-speeds in shorter time periods, limited sagging may occur due to the gravity effects. ITB formed using the exemplary methods disclosed herein can then have uniform thickness. That is, the combination of dip-coating with UV-curable coating materials can allow for control of thickness as well as thickness uniformity. In embodiments, the thickness of ITB can be uniform, for example, within a range of ±3 microns.

Additionally, because the previous coating layer is already UV cured, e.g., by a UV cross-linking, re-immersion of the coated substrate into coating composition in the dip tank does not result in dissolution of the previously cured layer. In contrast, multiple formation cycles can not be used in conventional methods of forming ITBs, because the re-immersion of the thermally cured layer into the coating composition can dissolve the previously formed layer.

Further, the UV-curing process can be environmentally friendly, e.g., producing little VOC (Volatile organic compounds) and consuming low energy. UV-curing can also provide resistance to stains, abrasions, and solvents, and can provide superior toughness. UV-curing can also provide high gloss compared with other coating methods.

In embodiments, the final coating layer can be parted, delaminated or released from the substrate and configured in a printer. The substrate 120 can also be surface treated prior to dipping into the coating composition so as to facilitate the later release of the formed ITB coating layer. Various releasing agents or parting agents known to one of ordinary skill in the art can be used.

The volume (or bulk) resistivity and the surface resistivity of the final ITB coating layer can be uniform with minimal variation. For example, a maximum value of volume resistivity can be within the range of 1 to 10 times the minimum value, and a maximum value of surface resistivity can be within the range of 1 to 100 times the minimum value.

The formed ITB can have a surface resistivity ranging from about $10^8$ ohms/sq to about $10^{13}$ ohms/sq, or ranging from about $10^9$ ohms/sq to about $10^{12}$ ohms/sq, or ranging from about $10^{19}$ ohms/sq to about $10^{11}$ ohms/sq. In embodiments, the formed ITB coating can have a mechanical Young's modulus ranging from about 500 MPa to about 10,000 MPa, or ranging from about 1,000 MPa to about 5,000 MPa, or ranging from about 1,500 MPa to about 3,000 MPa.

In embodiments, the formed ITB can also have multi-layer configurations. For example, a two-layer configuration can include an outer release layer disposed on the ITB. The outer release layer can include polymers suitable for release such as fluoropolymers or others as known to one of ordinary skill in the art. In another example, a three-layer configuration can include an outer release layer disposed on a conformable layer (e.g., silicone rubber), that is disposed on the ITB. In embodiments, other additional functional layers, for example, adhesive layers, can also be formed over the ITB.

In embodiments, the disclosed ITBs and method of their formation can include the materials and methods disclosed in co-pending U.S. patent application Ser. No. 12/624,589, filed Nov. 24, 2009, and entitled "UV Cured Heterogeneous Intermediate Transfer Belts (ITB)," and Ser. No. 12/731,449, filed Mar. 25, 2010, and entitled "Intermediate Transfer Belts," which are hereby incorporated by reference in their entireties.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for forming seamless intermediate transfer belt (ITB) comprising:
   a) providing a liquid coating composition comprising a UV curable compound;
   b) dipping an ITB mandrel in the liquid coating composition to form a coating composition covered ITB mandrel, the ITB mandrel shaped to allow formation of a seamless ITB;
   c) removing the coating composition covered ITB mandrel from the liquid coating composition;
   d) UV-curing the coating composition covered ITB mandrel to form a coating layer on the ITB mandrel; and
   e) releasing the UV-cured coating composition from the ITB mandrel, wherein the UV-cured coating composition released from the ITB mandrel forms the seamless intermediate transfer belt, wherein steps b)-d) do not further comprise air drying or heat-drying.

2. The method of claim 1 further comprising repeating the steps b)-d) to form a plurality of coating layers stacked on the ITB mandrel, wherein the plurality of stacked coating layers forms an ITB and the stacked coating layers have a combined thickness ranging from about 10 micron to about 500 microns.

3. The method of claim 2 further comprising:
simultaneously forming a plurality of adjacent ITBs on a single ITB mandrel, wherein a center-to-center spacing between the adjacent ITBs on the single ITB mandrel ranges from about 10 inches to about 200 inches; and
releasing the plurality of adjacent ITBs from the ITB mandrel and forming a plurality of ITBs from the plurality of adjacent ITBs.

4. The method of claim 3, wherein the single ITB mandrel is non-cylindrical and a single dip tank is used to contain the liquid coating composition for the single ITB mandrel to dip-coat.

5. The method of claim 1 further comprising withdrawing the coating composition covered ITB mandrel at a constant speed ranging from about 10 to about 400 millimeters per minute from the liquid coating composition after the dipping.

6. The method of claim 1 further comprising UV-curing the coating composition covered ITB mandrel upon the coating composition covered ITB mandrel exiting a dip tank that contains the liquid coating composition.

7. The method of claim 1, wherein the UV curable compound is selected from the group consisting of a monomeric acrylate, an oligomeric acrylate and a combination thereof;
wherein the monomeric acrylate is selected from the group consisting of trimethylolpropane triacrylate, hexanediol diacrylate, tripropyleneglycol diacrylate, dipropyleneglycol diacrylate, and a combination thereof; and
wherein the oligomeric acrylate is selected from the group consisting of urethane acrylate, polyester acrylate, epoxy acrylate, polyether acrylate, olefin acrylate comprising polybutadiene acrylate, and a combination thereof.

8. The method of claim 1, wherein the liquid coating composition further comprises one or more photoinitiators selected from the group consisting of acyl phosphines, $\alpha$-hydroxyketones, benzyl ketals, $\alpha$-aminoketones, and mixtures thereof.

9. The method of claim 1 further comprising preparing a homogeneous liquid coating composition by mixing a plurality of conductive species in a liquid UV curable compound to form a solution and adding one or more photoinitiators into the solution.

10. The method of claim 9, wherein the plurality of conductive species comprises salts of organic sulfonic acid, esters of phosphoric acid, esters of fatty acids, ammonium or phosphonium salts, or combinations thereof.

11. The method of claim 1 further comprising preparing a heterogeneous liquid coating composition by mixing a plurality of conductive fillers in a liquid UV curable compound to form a milled dispersion and adding one or more photoinitiators into the milled dispersion.

12. The method of claim 11, wherein the plurality of conductive fillers comprises carbon blacks, carbon nanotubes, fullerenes, polyanilines, stannic oxides, indium oxides, potassium titanates, or combinations thereof.

13. The method of claim 1 further comprising treating a surface of the ITB mandrel with a release agent prior to the dip-coating.

* * * * *